Figure 1:
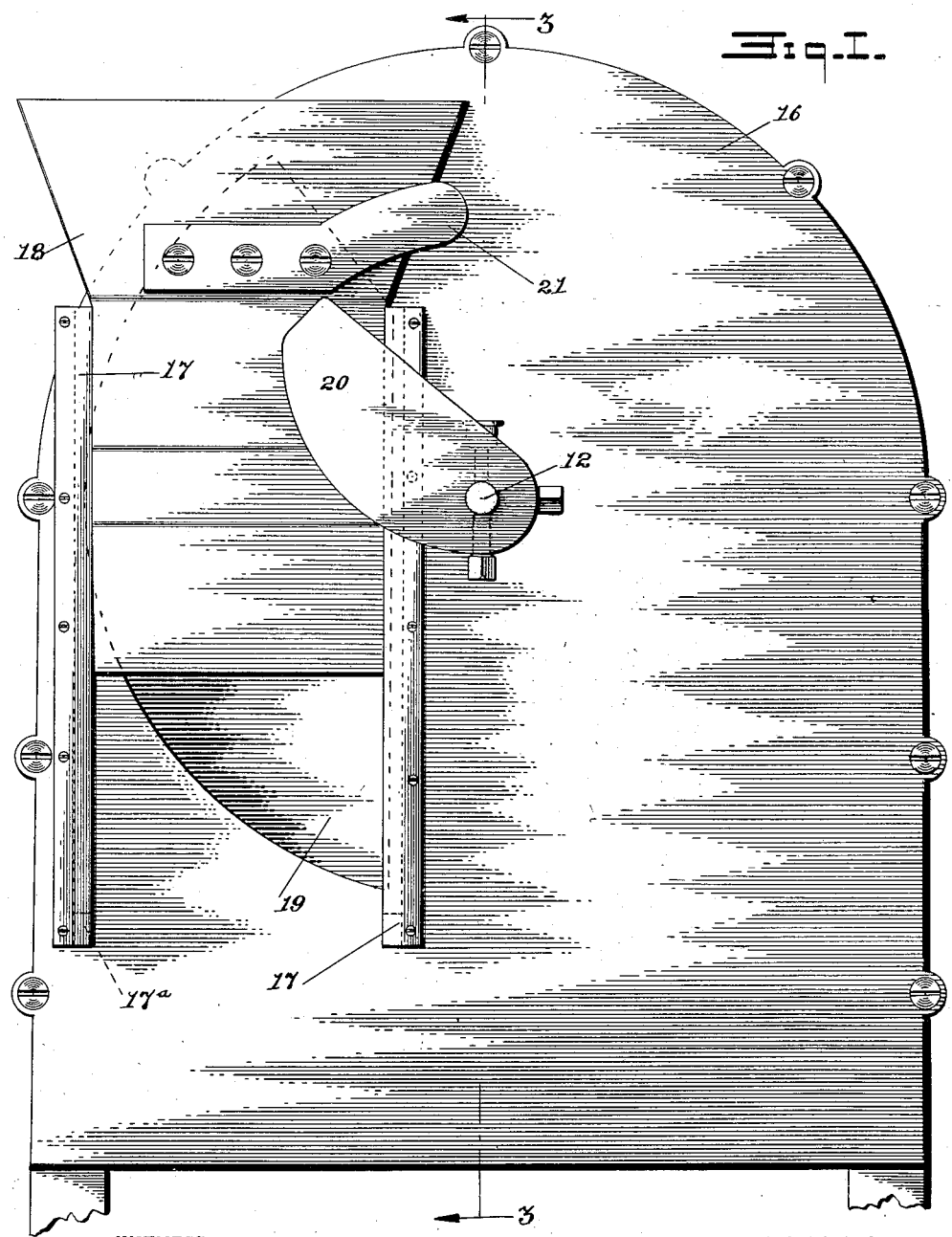

Sept. 4, 1934.  T. ETTER ET AL  1,972,586
SLICING MACHINE
Filed May 18, 1929   4 Sheets-Sheet 1

WITNESS:

INVENTORS
Thomas Etter
John L. Dunn
BY
ATTORNEY

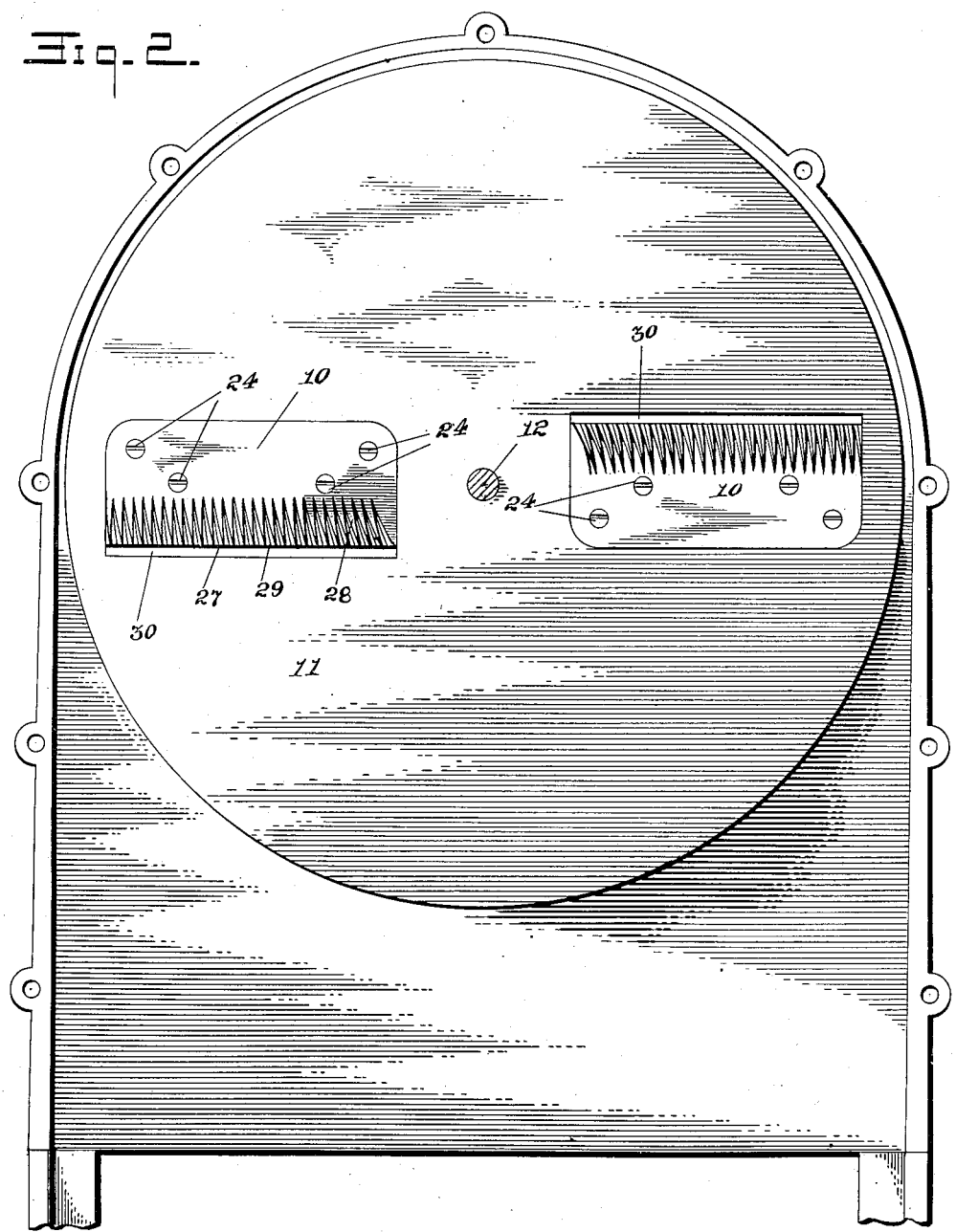

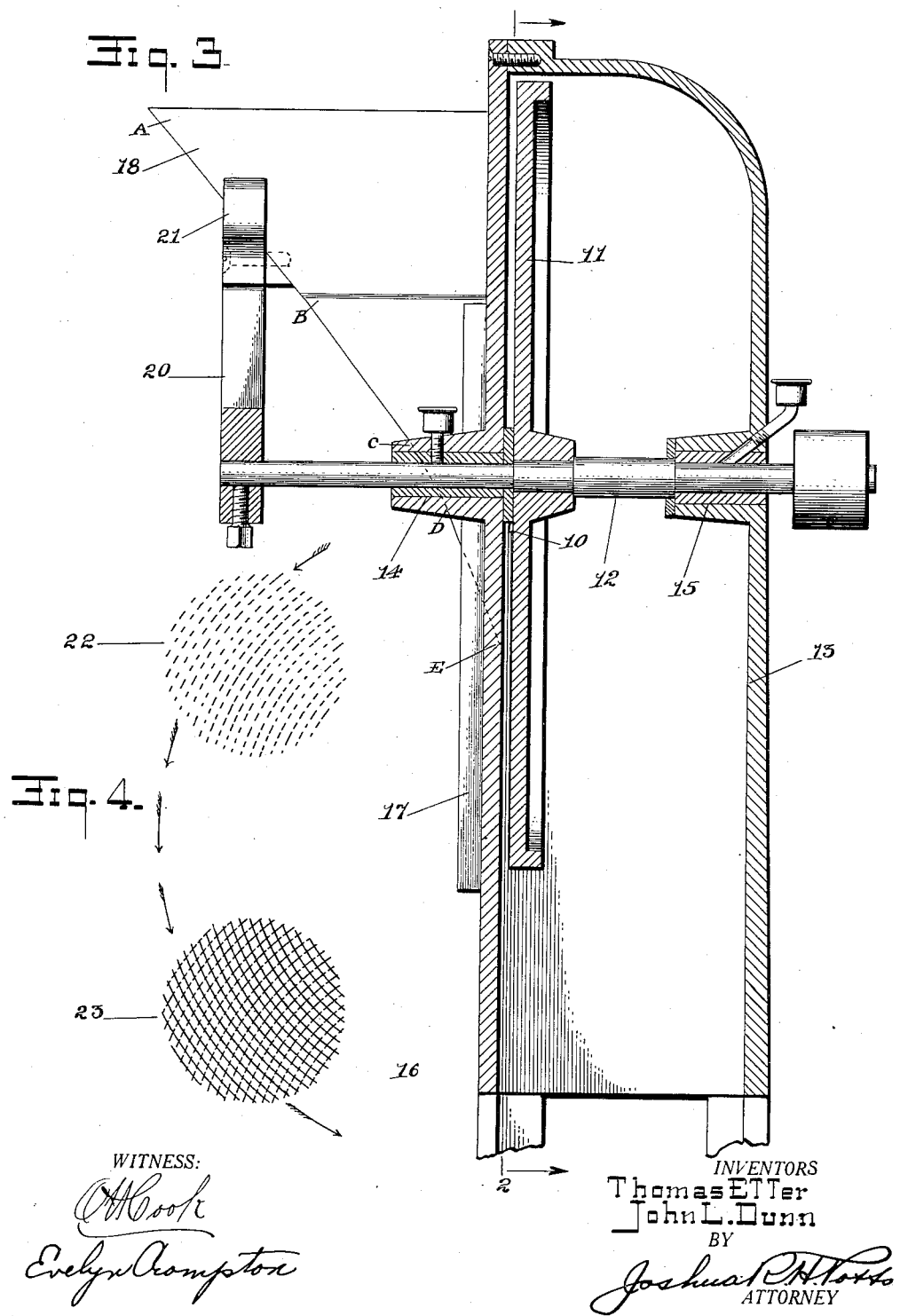

Sept. 4, 1934. T. ETTER ET AL 1,972,586
SLICING MACHINE
Filed May 18, 1929 4 Sheets-Sheet 4
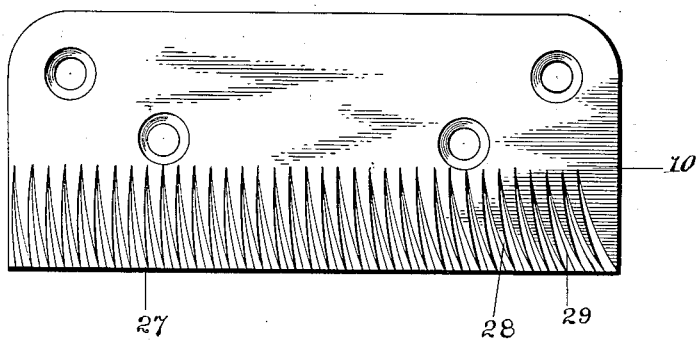
Fig. 5.
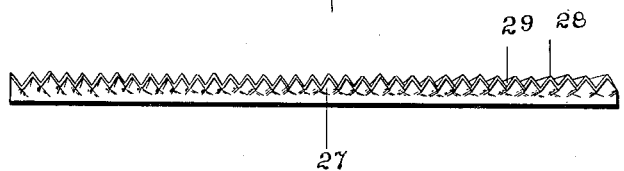
Fig. 6.
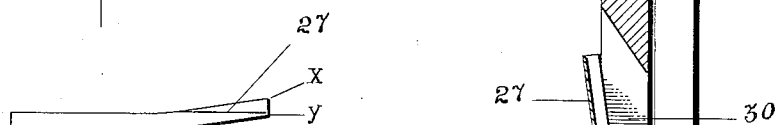
Fig. 7. Fig. 8. Fig. 9.
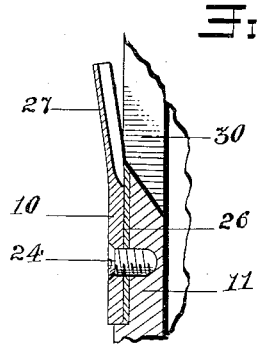
WITNESS:
O H Cook
Evelyn Crompton
INVENTORS
Thomas Etter
John L. Dunn
BY
Joshua R H Potts
ATTORNEY Patented Sept. 4, 1934

1,972,586

UNITED STATES PATENT OFFICE 1,972,586

SLICING MACHINE

Thomas Etter and John L. Dunn, Philadelphia, Pa.; said Dunn assignor to Margaretta H. Reinhart, Merion, Pa.

Application May 18, 1929, Serial No. 364,115

16 Claims. (Cl. 146—114)

The present invention relates to the process of cutting articles into slices, and a machine for carrying out the process.

An object of the invention is to provide a process by which articles may be cut into slices and the slices perforated incident to the cutting.

A further object is to provide a process by which grooved cuts may be made at angles to each other on opposite faces of the slices and so as to form perforations at the crossings of the grooves.

A still further object of the invention is to provide mechanism by which successive cuts may be made in varying directions across the article.

A fourth object of the invention is to provide mechanism by means of which articles may be cut into slices and perforations formed therein incident to the cutting.

The process consists briefly in cutting slices from an object alternately in varying directions in a manner so that grooves will be formed on one side intersecting with grooves formed on the other side made by a preceding cut.

The process may be carried out by providing a machine having cutting means formed with fluted cutting edges and movable in a path of varying directions relative to the article to be cut, together with means for feeding the article into the path of the cutting means successively at points of varying directions.

A machine illustrative of the above principles is shown in the accompanying drawings in which:—

Figure 1 is a side elevation of the machine showing the slidable hopper in relation to an aperture through the casing of the machine and showing the cam for operating said hopper, Figure 2 is a section on the line 2—2 of Figure 3 of the drawings showing the cutters mounted on a rotatable disc, Figure 3 is a section on the line 3—3 of Figure 1 further showing the relation of the hopper to the cam and to the disc, Figure 4 is a diagrammatic view showing the arrangement of ridges on opposite sides of a cut made by the machine, Figure 5 is a cutter shown on an enlarged scale and detached from the machine, Figure 6 is a view showing the cutting edge of the cutters, Figure 7 is an end view of the cutter showing the tapering nature of the corrugations of the fluted edge, Figure 8 shows the application of the cutter to the disc, and Figure 9 shows the adjustment of the cutting members to the carrying disc for a cut of a depth varying from that for which it is adjusted in Figure 8.

In experiments made in connection with the production of potato chips, we have discovered that a superior product may be produced by cutting the chips so as to provide alternate ridges and depressions on the two sides thereof extending at an angle to each other. It has also been discovered that perforations may be formed in the slice by forming the depressions on each surface of sufficient depth to intersect those on the other surface. Therefore, by producing a relative movement between the potato and a cutting member having a fluted cutting edge successively in varying directions across the potato in substantially parallel planes spaced apart a distance such that the paths of movement of the convolutions of the cutting edge relative to the potato on opposite sides of the slice will overlap and intersect so that slices will be produced having alternate ridges and depressions on the opposite faces with perforations through the potatoes at the crossings of said depressions, thereby not only producing a slice of attractive design of lacelike effect, but also providing a slice which will fry to a more palatable crispness.

We have further devised a mechanism which will automatically carry out the succession of steps of the above process. This mechanism comprises one or more cutters mounted for movement in a path of varying directions. This may be accomplished, as in the present embodiment, by mounting the cutters, as at 10, on a rotatable disc 11 secured to the shaft 12 extending transversely of a casing 13 in which it is journaled as at 14 and 15.

The bearing 14 is located in a removable wall 16 which is also provided with slideways 17 to accommodate side flanges on a feeding hopper 18 slidable therein and operable in a vertical plane. The hopper is positioned relative to the disc 11 so as to have a feed through the opening 19 in the wall 16 toward the disc and across the path of travel of the cutters 10, said opening 19 being shown partly in dotted and partly in full lines in Figure 1 of the drawings. The slideways are provided at their lower ends with suitable buffers 17ᵃ shown dotted in Figure 1 against which it impinges at the lower limit of its travel.

The shaft 12 has mounted thereon for rotation therewith a cam 20 cooperating with a cam follower 21 secured to the hopper for causing a reciprocation of the said hopper in timed relation to the movement of the cutters so that the feed from the hopper to the cutters will be successively in positions relative to the path of the cutters to produce a cut across the potato alternately in varying directions.

In order to insure a more perfect feed of articles to be sliced from the hopper against the rotating disc, the hopper is given a construction peculiarly adapting it to this end. By reference to Figure 3 of the drawings, it will be noted that the slope of the hopper toward the disc varies, as between the upper portion A—B, portion B—C, portion C—D, and portion D—E so that as the potato is diminished in size by successive cuts it will be held firmly against the disc and will be prevented by the increasing contact with the feeding wall of the hopper from turning over and presenting a different side from that on which the preceding cut was taken.

It will be seen by reference to the diagram shown in Figure 4 that when the hopper is in its upper position the cut will be in the direction of the arrows and will produce alternate ridges and depressions, as indicated by the dotted lines and the space therebetween.

The next cut on the potato will produce ridges and depressions on the opposite side of the slice in a direction varying from those shown at the upper part of the diagram and designated by the numeral 22, as shown in full lines in the lower position of the potato, as designated by the numeral 23.

The cutting of the slices in this manner may be made to produce perforations at the crossings of the depressions by so regulating the depth of the cut corresponding to the thickness of the cutting edge, (that is, a distance between the points $x$—$y$, as indicated in Figure 7 of the drawings) that the depressions on one side of a slice will intersect those on the other side.

In order that a cut of this depth may be effected, the cutters 10 are bent upwardly toward the cutting edges a suitable distance. In the drawings, this distance is shown as equal to the thickness of the cutters so that when mounted on the disc 11 the cutting edge will extend laterally therebeyond a distance equal to its thickness, as shown in Figure 8. The cutters are secured to the disc 11 by means of screws 24 and the cutters may be adjusted to take a cut of varying depths by either bending the effective cutting edges 25 thereof to a greater or less degree or by placing between the cutters and the disc shims or washers 26, as shown in Figure 9.

The fluting or corrugation of the cutting edge is shown at 27 in various aspects in the several Figures 2, 5, 6, 7 and 8, the same being formed on the cutting member by ridges 28 and alternate depressions 29 formed on opposite faces of the cutter and arranged to lie, where mounted, on a disc, as in the present embodiment, in concentricity to the axis of rotation which, in the present instance, is the shaft 12.

In the operation of the mechanism, the potatoes, vegetables or other articles to be cut are placed in the hopper 18 which opens toward the disc 11 and discharges through the opening 19 in the casing. As stated above, the cam 20 is so placed on the shaft 12 and so related to the follower 21 that the hopper will be raised when one of the cutters is passing the upper limit of travel of the said hopper in a direction from right to left and will travel to its lower limit under the force of gravity before the other of the cutters reaches that portion of the path of travel of the hopper.

The alternative cuts, therefore, on the potatoes will be in varying directions producing ridges and depressions which cross each other and when the relative position of the cutting edge to the disc is properly regulated, the depressions made by the preceding cut forming perforations at their intersections, and the cuts will fall through the apertures 30 formed in the disc in the rear of the cutters.

These apertures are of radial extent equal to the length of the cutting edge and are of sufficient depth to permit the free passing of the slices or chips therethrough, the chips falling down the casing into a receptacle, not shown, placed therebeneath and the casing being open at its lower end, as shown in Figure 3.

It will be understood that the relation of the cutting edges to the disc may be varied so as to provide no apertures at all or to provide apertures of varying extent either by a proper selection of washers or shims or by the degree of bending of the cutting edge laterally of the disc.

It will be understood that the cutting edge may vary from the configuration as shown and a greater or less number of cutters may be provided on the disc than shown in the present embodiment.

As a variation from cuts made by cutters mounted on a rotating disc, cuts may also be alternately made by cutting edges moving in the same plane and in crossing paths of operation or that the potato or other objects to be cut may be the moving member with the cutter or cutters stationary.

As intimated above, the principles herein laid down may be applied to the cutting of any vegetable of the tuber or root-like type and to other objects as meats, where the above effects are desired.

It will be also understood that other means may be provided than a disc for moving the cutters within the purview of the invention and that various changes in details may be resorted to within the scope of the invention as herein outlined and hereinafter claimed.

1. A slicing machine including a rotatable disc, a cutting element thereon, and means for feeding an object into the path of the cutter successively at different points therealong.

2. A slicing machine including a rotary cutter, having a corrugated cutting edge, and means for feeding an object into the path of the cutter alternately at different points along said path.

3. A slicing machine including a cutter having a corrugated cutting edge, means for moving said element in a path of varying directions, and means for feeding an article to be sliced into said path successively at different positions relative to the said varying directions and in timed relation to the movement of said cutter across said positions.

4. A slicing machine including a plurality of cutters having corrugated cutting edges moving in the same path, said path having a variance of directions, means for feeding an article to be sliced into said path successively at different positions relative to the said varying directions and alternately in opposition to different cutters at the various positions.

5. A slicing machine including a cutter having a corrugated cutting edge moving in a path of varying directions, a hopper feeding into the path of said cutter and movable to positions opposite points of the path of varying directions.

6. A slicing machine including a cutter having a corrugated cutting edge moving in a path of varying directions, a hopper feeding into the path of said cutter, and movable to positions opposite points of the path of varying directions, and means for moving said hopper in timed relation to the passing of the cutter through the said points.

7. A slicing machine including a cutter having a corrugated cutting edge moving in a path of varying direction, a hopper feeding into the path of said cutter, and movable to positions opposite points of the path of varying directions, means for moving the cutter in said path, and means associated with the moving means and automatically operable thereby for positioning the hopper opposite various positions relative to the said varying directions in the path.

8. A slicing machine including corrugated cutting means movable in a circular path, a hopper feeding to said cutting means and movable on a chord of said circular path.

9. A slicing machine including a rotatable disc having corrugated cutter means radially placed thereon, a hopper feeding against said disc and movable across the path of the cutter means at positions of varying directions thereof.

10. A slicing machine including a casing, a disc rotatable adjacent and parallel to one wall thereof and having cutting means thereon, said wall having an opening on one side of the axis of rotation extending across the path of movement of the cutting means at two positions of opposite directions thereof, a hopper feeding through said opening and movable to positions at the extreme limits thereof.

11. A slicing machine including a rotatable shaft, corrugated cutting means secured to the shaft for rotation therewith, a hopper feeding to the path of said cutting means, a cam on said shaft, a cam follower on the hopper, said cam being of such shape as to position the hopper successively at varying points of the path of travel of said cutting means.

12. The method of producing a perforated slice consisting in moving a fluted knife about a point as a center with the edge of the knife as a radius, presenting an article to the action of the knife to produce arcuate hills and dales, and moving the article to a different position in the arc of movement and removing a slice with the arcuate dales crossing and communicating with the dales of the first cut.

13. The method of producing a perforated slice consisting in moving a fluted knife about a point as a center with the edge of the knife as a radius, presenting an article to the action of the knife to produce arcuate hills and dales, and moving the article to a different position in the arc of movement and removing a slice with the arcuate dales crossing and communicating at the several points of crossing with the dales of the first cut.

14. A slicing machine comprising a plurality of cutters traveling in the same curvilinear orbit, and means presenting the same article to the action of the cutters successively at alternate points in the orbit.

15. A slicing machine comprising a plurality of cutters traveling in the same curvilinear orbit, and means reciprocating in a straight line presenting the same article to the action of the cutters successively at different arcs of the orbit.

16. A slicing machine comprising a plurality of cutters traveling in the same orbit, and means reciprocating in a straight line on a cord of the orbit to present the same article to the action of the cutters successively at alternate points in the orbit.

THOMAS ETTER.
JOHN L. DUNN.